W. ZEMAN.
POWER TRANSMISSION APPARATUS.
APPLICATION FILED APR. 4, 1919.
1,337,873.
Patented Apr. 20, 1920.
4 SHEETS—SHEET 4.
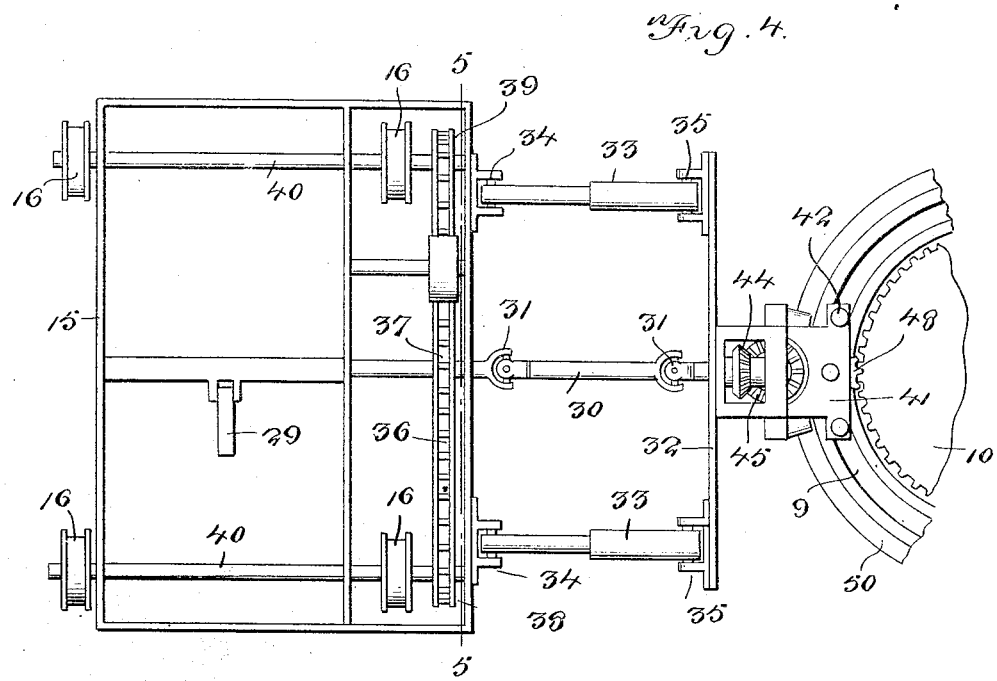
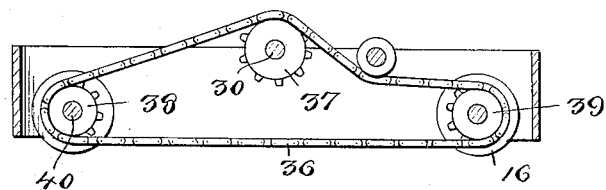
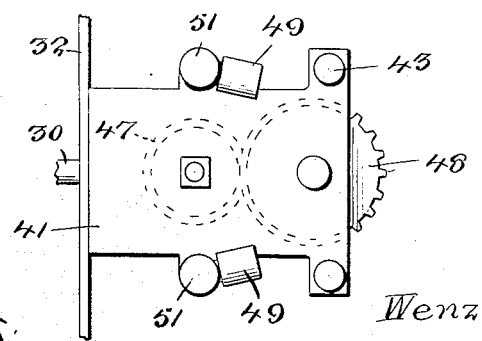
WITNESSES:
INVENTOR
Wenzel Zeman
BY
Victor J. Evans
ATTORNEY

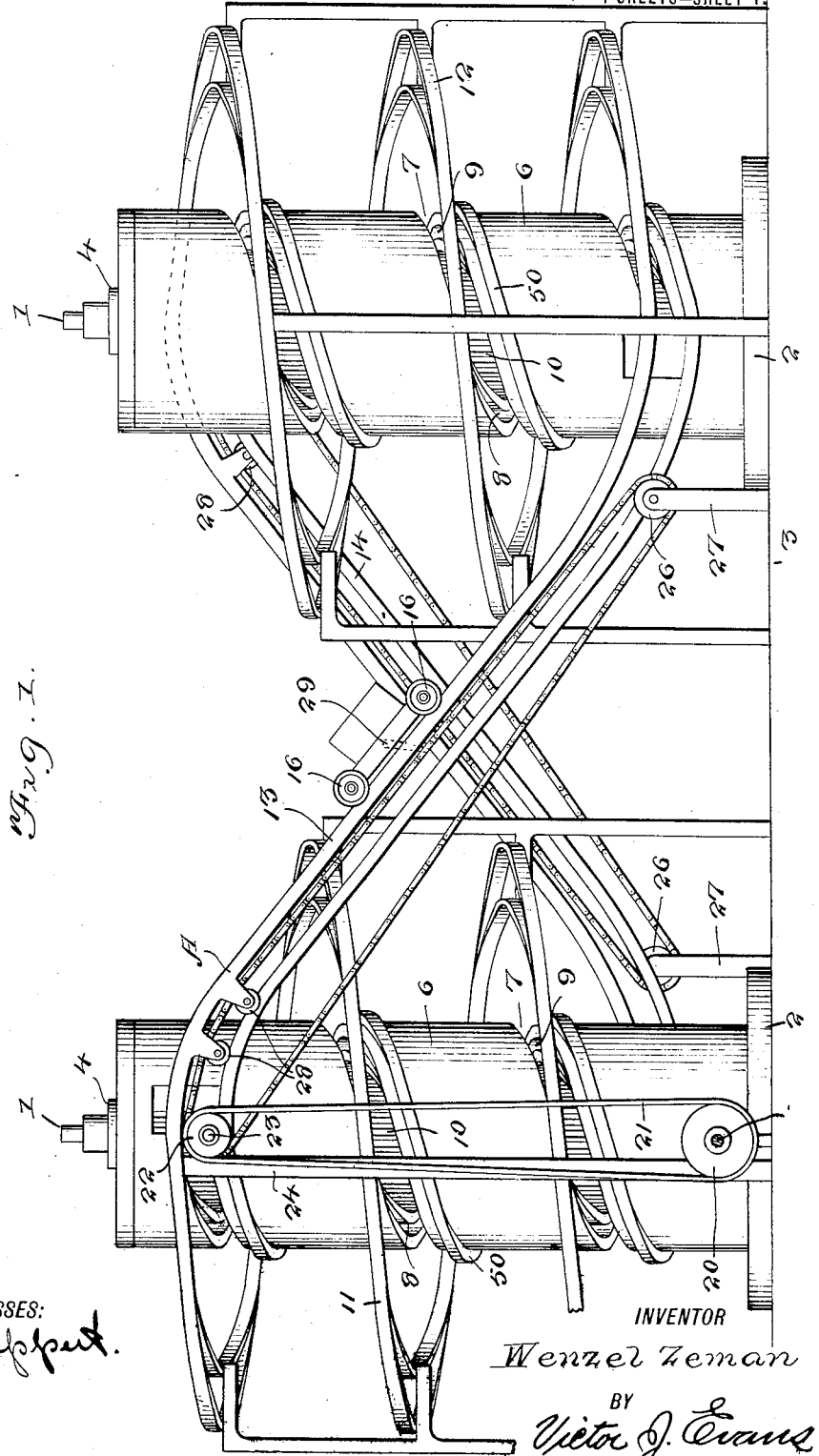

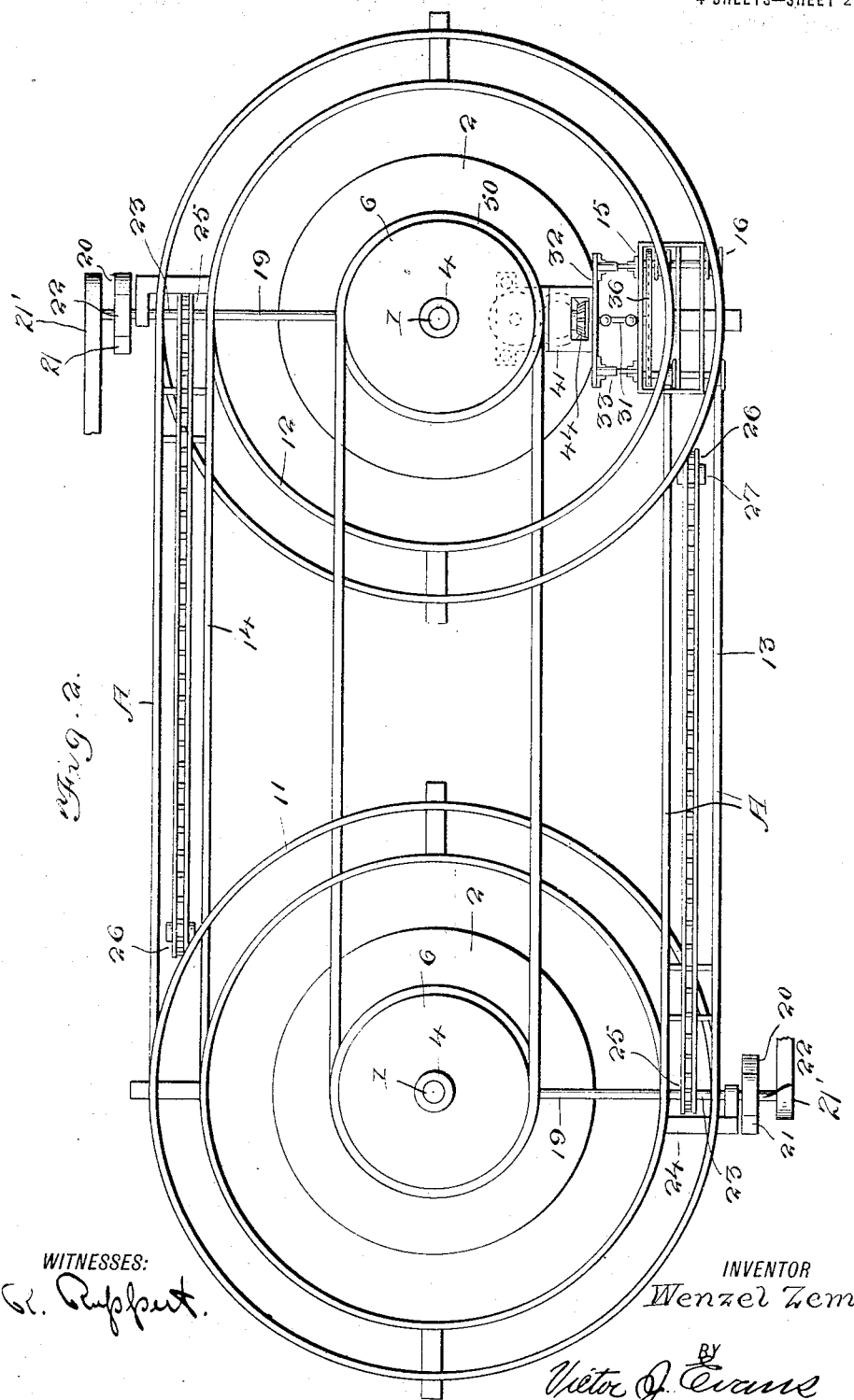

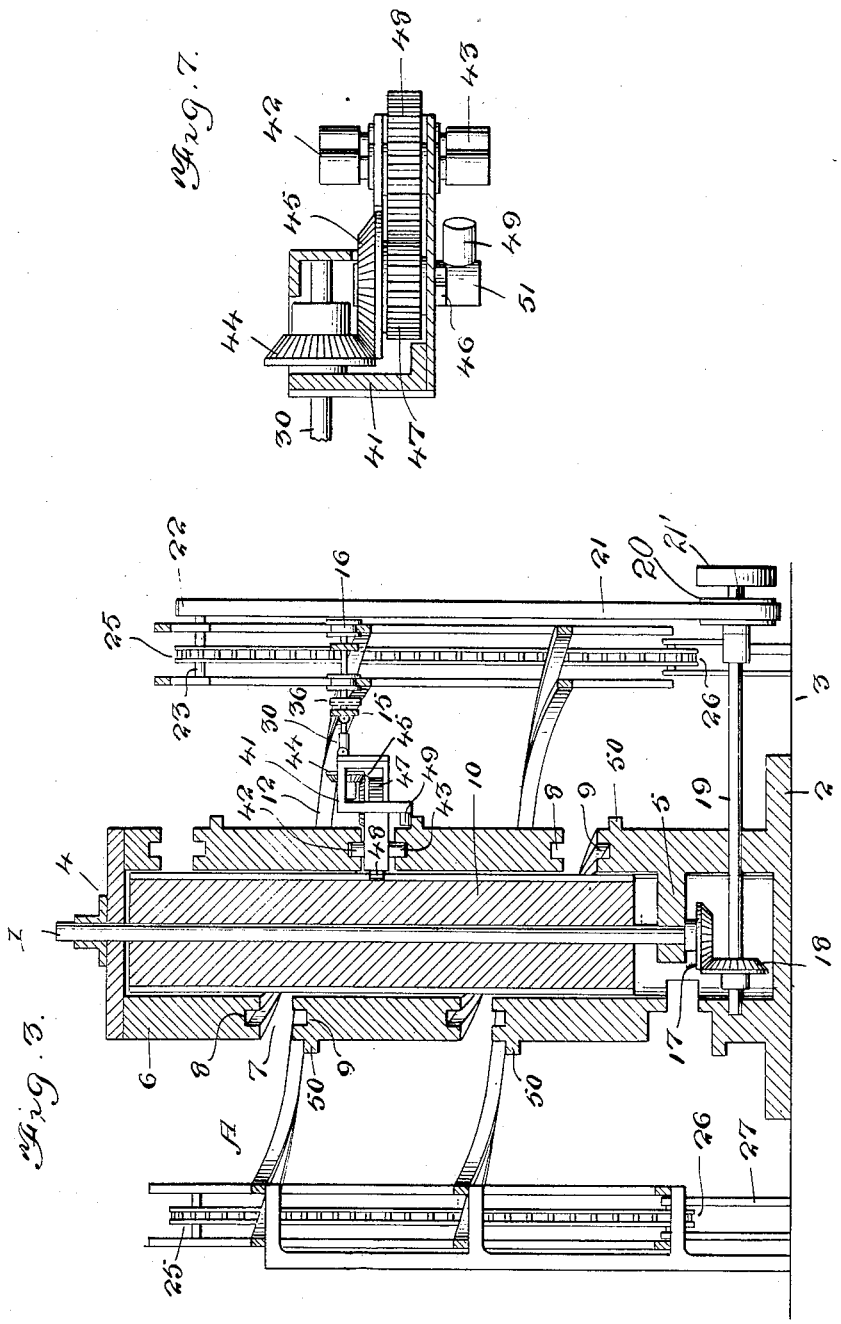

UNITED STATES PATENT OFFICE.

WENZEL ZEMAN, OF SCHENECTADY, NEW YORK.

POWER-TRANSMISSION APPARATUS.

1,337,873.　　　　Specification of Letters Patent.　　Patented Apr. 20, 1920.

Application filed April 4, 1919. Serial No. 287,566.

*To all whom it may concern:*

Be it known that I, WENZEL ZEMAN, a citizen of the United States, residing at Schenectady, in the county of Schenectady and State of New York, have invented new and useful Improvements in Power-Transmission Apparatus, of which the following is a specification.

This invention relates to power transmission apparatus, the object in view being to provide mechanism involving the use of wheeled cars or bodies traveling upon an endless track having ascending and descending portions, together with means operated by said wheeled bodies for transmitting motion to one or more rotary shafts mounted in stationary bearings, from which motion is belted or otherwise transmitted to the car elevating means.

With the other objects in view the invention consists in the construction, combination and arrangement of parts, as herein described, illustrated and claimed.

In the accompanying drawing:

Figure 1 is a side elevation of the power transmission apparatus.

Fig. 2 is a plan view of the same.

Fig. 3 is a vertical transverse section taken in line with one of the vertical rotary shafts.

Fig. 4 is a plan view of one of the cars and adjacent parts.

Fig. 5 is a vertical longitudinal section through the same on line 5—5 of Fig. 4.

Fig. 6 is an enlarged bottom plan view of one of the car gear carriages.

Fig. 7 is a vertical sectional view of the same.

In the preferred embodiment of my invention, I employ two vertical rotary shafts 1 arranged in spaced relation to each other as shown in Figs. 1 and 2, each of said shafts being supported by a suitable base 2 mounted upon a foundation 3.

Each of the shafts 1 as best shown in Fig. 3, is journaled adjacent to its upper and lower ends in bearings 4 and 5, said bearings forming part of a vertical cylindrical guide 6 having a spiral guideway 7 in the form of a slot extending entirely through the guide 6 which is of tubular formation as shown in said Fig. 3. The top and bottom faces of the guideway 7 are formed with guiding grooves 8 and 9 arranged one above the other, the purpose of which will presently appear. The upper bearing 4 above referred to is in the form of a cap plate or section at the top of the tubular guide 6. Fast on each shaft 1 is a cylindrical barrel shaped gear 10 as best shown in Fig. 3 and by means of which motion is imparted to the shaft 1 by a mechanism hereinafter more particularly described.

Encircling the two rotary shafts 1 and the guide 6 surrounding the same is an endless track designated generally at A and comprising two spiral portions 11 and 12 encircling the shafts 1 and 1 as shown in Figs. 1 and 2 said endless track also comprising ascending portions 13 and 14, the spiral portions 11 and 12 of said track forming what are hereinafter termed the descending portions of the track. The track is shown as comprising two rails which at some places are concentric with each other and in the other places are parallel to each other as clearly indicated in the drawing, said track being adapted to guide a plurality of wheeled bodies or cars, one of which is shown at 15, each wheeled body or car comprising wheels 16 which travel upon the rails of the track.

Referring again to Fig. 3, each of the shafts 1 has fast on the lower end thereof a beveled gear 17 which meshes with another beveled gear 18 on a horizontal countershaft 19 which is journaled in bearings in the face of the respective guides 6 and extends laterally therefrom, the shaft 19 being provided at its outer end with a pulley or wheel 20 around which passes a belt or chain 21. The belt 21 is trained upwardly over an elevated pulley 22 on an overhead shaft 23 journaled in one or more bearings supported by a frame work 24. As shown in Fig. 1 one or two of such frame works are employed, the same extending upwardly from the supporting head or foundation 3.

Fast on the shaft 23 is a sprocket wheel 25 (see Fig. 2), said chain extending at an inclination downwardly around another sprocket wheel 26 supported upon a bracket or post 27, the upper rim of the chain which passes around the sprocket wheels 25 and 26, extending just under the ascending portion of the track at that point and being guided at the upper portion of said track by means of supporting rollers or pulleys 28 as shown in Fig. 1. The wheeled body or car 15 carries a hook or clutch 29 which is engaged by the upwardly running portion of the sprocket chain for the purpose of carrying the wheeled body upwardly along the respective ascending portion of the track until the car reaches and passes beyond the highest point of the track after which it descends by gravity along the spiral descending portion of the track as will be readily understood.

Referring now more particularly to Figs. 4, 5, 6 and 7, in connection with Figs. 2 and 3, it will be seen that at the inner side of the car 15 and projecting centrally therefrom is a flexible or tumbling shaft 30 embodying one, two or more universal joints 31. The outer end portion of the shaft 30 is journaled in a supporting bar 32 parallel to the inner side of the car 15 and connected with the frame of the car for up and down movement relatively thereto by means of telescopic connecting rods 33. The connecting rods or arms 33 are connected by pivots 34 to the frame of the wheeled body 15 and are connected by other pivots 35 to the bar 32 as shown in Fig. 4. Rotary motion is imparted to the shaft 30 by means of an endless chain 36 which passes over a sprocket wheel 37 on the shaft 30 as shown in Fig. 5 and also over sprocket wheels 38 and 39 on the axle 40 of the wheeled body or car.

Fastened to the bar 32 is a gear carriage 41 having projecting from its lower and upper sides rollers 42 and 43 which travel in the spiral grooves 8 and 9 of the guideways 7 hereinabove referred to, thereby preventing the carriage from becoming disconnected from the guide 6 except when the car is traveling upon the ascending portions of the track. This prevents the car from leaving the rails while traveling rapidly around the spiral descending portion of the endless track. Fast on the outer end of the shaft 30 is a beveled gear 44 which meshes with another beveled gear 45 on a short vertical shaft 46 also having fast thereon a spur gear 47 which meshes with another spur gear 48, the last mentioned gear meshing with the teeth of the cylindrical barrel gear 10 on the vertical rotary shaft 1, in the manner illustrated in Fig. 3, for example. The gear carriage 41 is further supported and steadied in its movement by means of a horizontally disposed roller 49 located beneath the body of the carriage, said roller 49 traveling upon a projecting spiral ledge or rib 50 surrounding the vertical tubular guide 6 as shown in Fig. 3. The gear carriage 41 is also shown provided with other rollers 51 on the underside thereof which roll and bear against the periphery of the spiral rib or ledge 50 of each guide 6.

In describing the operation of the power transmission mechanism, it is to be understood that a number of cars are employed, the number of cars or wheeled bodies being in accordance with the entire length of the endless track. The spiral descending portions of the track are of considerably greater length than the straight inclined ascending portions thereof and therefore as one car or wheeled body is being propelled upwardly along one of the ascending portions of the track by means of the sprocket chains, a plurality of cars are simultaneously descending the spiral portions of the track around the rotary shaft 1, thereby contributing by their combined weight to assist in elevating the car moving upwardly along the inclined ascending portion of the track. As each wheeled body or car 15 is moving around the descending spiral portion of the track, the flexible or tumbling shaft 30 which is rotatably driven thereby, imparts motion through the beveled gears 44 and 45 and the spur gears 47 and 48 to the respective barrel gear 10 which being fast upon the adjacent vertical rotary shaft 1, imparts motion to the latter. The shaft 1 in turn imparts to the counter-shaft 19 by means of the beveled gears 17 and 18 and through the medium of the belt 21 motion to the adjacent endless chain which serves as the propelling means for elevating the cars or wheeled bodies along the adjacent ascending portions of the track.

Any suitable means may be employed for imparting motion to any working part of the mechanism hereinabove described for the purpose of maintaining the wheeled bodies or cars in running order, thereby insuring the elevation of the cars or wheeled bodies along the ascending portions of the track especially in primarily starting the apparatus in operation when a certain excess power is required for that purpose. The drawings show a pulley 21' on each of the shafts 19 which are belted to any suitable form of motor or the like so that said shafts may be driven from said driving means.

I do not desire to be limited to the exact details of construction and arrangement of parts herein shown and described, it being apparent that the various changes may be made in the form, proportion and minor details of construction without departing from the spirit or sacrificing any of the advantages of the invention.

What I claim is:—

1. In an apparatus of the class specified, two vertical rotary shafts in spaced relation to each other, cylindrical barrel gears fast thereon, an endless track embodying spiral runs encircling said shafts and inclined and substantially rectilinear runs forming continuations of said spiral runs, a wheeled body supported by and movable along said track, gearing means carried by said body and adapted to transmit motion to said vertical shafts and means driven by said shafts for propelling said body along the said inclined and substantially rectilinear runs of the track.

2. In an apparatus of the class specified, two vertical rotary shafts in spaced relation to each other, cylindrical barrel gears fast thereon, an endless track embodying spiral descending runs encircling said shafts and inclined and substantially rectilinear ascending runs forming continuations of said spiral runs, a wheeled body supported by and movable along said track, gearing means carried by said body and adapted to transmit motion to said vertical shafts, and means driven by said shafts for propelling said body along the ascending runs of the track.

3. In an apparatus of the class specified, two vertical rotary shafts in spaced relation to each other, cylindrical barrel gears fast thereon, an endless track embodying spiral descending runs encircling said shafts and inclined and substantially rectilinear ascending runs forming continuations of said spiral runs, a wheeled body supported by and movable along said track, gearing means carried by said body and adapted to transmit motion to said vertical shafts, and means driven by said shafts for propelling said body along the ascending runs of the track, a gear carriage attached to said body, and endless guiding means for said carriage having substantially the same general curvature and runs as said track.

4. In an apparatus of the class specified, two vertical rotary shafts in spaced relation to each other, cylindrical barrel gears fast thereon, an endless track embodying spiral descending runs encircling said shafts and inclined and substantially rectilinear ascending runs forming continuations of said spiral runs, a wheeled body supported by and movable along said track, gearing means carried by said body and adapted to transmit motion to said vertical shafts, and means driven by said shafts for propelling said body along the ascending runs of the track, the last named means including endless chains having runs thereof extending along the ascending runs of the track.

In testimony whereof I affix my signature.

WENZEL ZEMAN.